(12) United States Patent
Dorrough

(10) Patent No.: US 11,912,602 B2
(45) Date of Patent: Feb. 27, 2024

(54) WATER CONDITIONING FOR BACTERIAL CONTROL

(71) Applicant: John Dorrough, Woodinville, WA (US)

(72) Inventor: John Dorrough, Woodinville, WA (US)

( * ) Notice: Subject to any disclaimer, the term of this patent is extended or adjusted under 35 U.S.C. 154(b) by 106 days.

(21) Appl. No.: 17/586,692

(22) Filed: Jan. 27, 2022

(65) Prior Publication Data

US 2022/0242767 A1 Aug. 4, 2022

Related U.S. Application Data

(60) Provisional application No. 63/143,841, filed on Jan. 30, 2021.

(51) Int. Cl.
*C02F 9/00* (2023.01)
*C02F 1/48* (2023.01)
(Continued)

(52) U.S. Cl.
CPC ............ *C02F 9/00* (2013.01); *C02F 1/36* (2013.01); *C02F 1/38* (2013.01); *C02F 1/442* (2013.01);
(Continued)

(58) Field of Classification Search
CPC ...... C02F 9/00; C02F 1/36; C02F 1/38; C02F 1/442; C02F 1/4618; C02F 1/48; C02F 1/66; C02F 2001/46133; C02F 2001/46185; C02F 2209/006; C02F 2209/05; C02F 2209/06; C02F 2209/10; C02F 2209/40; C02F 2301/043; C02F 2301/046; C02F 2303/04; C02F 2303/08; C02F 2303/22; C02F 2307/14; C02F 1/34; C02F 1/4606; C02F 1/481; C02F 2209/008; C02F 1/001; C02F 1/004; C02F 1/30; C02F 1/302;
(Continued)

(56) References Cited

U.S. PATENT DOCUMENTS 4,464,315 A * 8/1984 O'Leary ............... G05D 21/02
137/5
4,883,591 A * 11/1989 Belasco ................. C02F 1/481
210/222

(Continued)

*Primary Examiner* — Joseph W Drodge

(57) ABSTRACT

A water conditioning system for evaporative cooling systems reduces operating costs and microbial contamination by introducing positively charged copper-silver ions into water used as a working fluid. Some of the recirculating water is also passed through a magnetic conditioner to increase its conductivity. By concentrating the total dissolved solids (TDS) in a portion of the water to be expelled, the remaining system water plus new make-up water added contains far lower TDS, reducing health risks, maintenance costs, corrosion, and scaling, and extending service life of replaceable filter elements and system machinery. Recovering non-chemically treated cooling tower bleed water with commercial scale nanofiltration water polishing equipment and returning that polished water back to the cooling tower water basin reduces the make-up water required, and may achieve 70% or greater reduction in sewer fees for tower bleed water, along with increased cycles of concentration further reducing requirement for make-up water.

20 Claims, 3 Drawing Sheets

(51) Int. Cl.
*C02F 1/38* (2023.01)
*C02F 1/44* (2023.01)
*C02F 1/36* (2023.01)
*C02F 1/46* (2023.01)
*C02F 1/66* (2023.01)
*C02F 1/461* (2023.01)

(52) U.S. Cl.
CPC .............. *C02F 1/4618* (2013.01); *C02F 1/48* (2013.01); *C02F 1/66* (2013.01); *C02F 2001/46133* (2013.01); *C02F 2001/46185* (2013.01); *C02F 2209/006* (2013.01); *C02F 2209/05* (2013.01); *C02F 2209/06* (2013.01); *C02F 2209/10* (2013.01); *C02F 2209/40* (2013.01); *C02F 2301/043* (2013.01); *C02F 2301/046* (2013.01); *C02F 2303/04* (2013.01); *C02F 2303/08* (2013.01); *C02F 2303/22* (2013.01); *C02F 2307/14* (2013.01)

(58) Field of Classification Search
CPC .... C02F 1/32; C02F 1/325; C02F 1/44; C02F 1/46; C02F 1/461; C02F 1/488; C02F 1/50; C02F 1/5236; C02F 1/68; C02F 1/685–687; C02F 2103/023; C02F 2209/005; C02F 2301/04; B01D 61/027; B01D 61/04; B01D 63/16; B01D 2311/2607; B01D 2311/2611; B01D 2311/2625; B01D 2311/2619; B01D 2311/2676; B01D 2201/20; B01D 2201/54; B01D 2313/42; B01D 2315/02; B01D 2315/05

See application file for complete search history.

(56) References Cited

U.S. PATENT DOCUMENTS

| | | | | |
|---|---|---|---|---|
| 5,332,494 | A * | 7/1994 | Eden | C02F 1/686 |
| | | | | 324/438 |
| 5,993,671 | A * | 11/1999 | Peltzer | C02F 1/008 |
| | | | | 210/85 |
| 8,268,178 | B1 * | 9/2012 | Manning | C02F 1/481 |
| | | | | 210/695 |
| 10,526,225 | B1 * | 1/2020 | Moya | B01D 71/02 |
| 2011/0186513 | A1 * | 8/2011 | Vuong | B01D 65/08 |
| | | | | 210/636 |
| 2013/0015137 | A1 * | 1/2013 | Urmenyi | B01D 37/048 |
| | | | | 210/744 |
| 2013/0056413 | A1 * | 3/2013 | Miranzadeh | F28F 25/00 |
| | | | | 210/636 |
| 2013/0126431 | A1 * | 5/2013 | Henson | G06Q 10/08 |
| | | | | 210/103 |
| 2013/0213888 | A1 * | 8/2013 | Tempest, Jr. | C02F 9/00 |
| | | | | 210/639 |
| 2014/0021134 | A1 * | 1/2014 | Lechuga Andrade | B01D 63/16 |
| | | | | 210/652 |
| 2019/0135661 | A1 * | 5/2019 | Ellers | C02F 1/463 |
| 2019/0276899 | A1 * | 9/2019 | Bernt | C12Q 1/6886 |
| 2022/0135443 | A1 * | 5/2022 | Lin | C02F 1/441 |
| | | | | 210/652 |
| 2022/0178629 | A1 * | 6/2022 | Eliosov | B01D 65/02 |
| 2022/0226782 | A1 * | 7/2022 | Yoon | B01D 65/02 |

* cited by examiner

WATER CONDITIONING FOR BACTERIAL CONTROL

CROSS REFERENCE TO RELATED APPLICATION

This application claims the benefit of and priority to U.S. Provisional Patent Application 63/143,841 "Water Conditioning for Bacterial Control," filed 30 Jan. 2021. The entire contents of U.S. Provisional Patent Application 63/143,841 "Water Conditioning for Bacterial Control," filed 30 Jan. 2021 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to water conditioning and conservation treatments and equipment to reduce corrosion and reduce bacterial population in water recirculated in industrial systems.

BACKGROUND

From the initial inventions of water circulation for industrial processes and building climate controls to the present day, microbial contamination has been a problem to be grappled with. Some heat transfer machinery leverages the larger energies consumed by phase changes of water, especially between liquid and vapor states. In areas of low humidity evaporative cooling is often effective, but these systems tend to include substantial portions where darkness within piping and operating temperatures combine to provide an ideal environment for microorganisms including strains of bacteria, viruses, molds, slimes, algae, and mildews.

Microbial growths in industrial water cooling systems such as heating, ventilation, and air conditioning (HVAC) can reduce energy efficiency and contaminate the air in a building. Although more of a risk in hot, humid areas like tropical coasts, microbial problems may occur in buildings anywhere, and building occupants and maintenance workers flushing out systems or changing filters may be exposed to *legionella*, coliforms, *salmonella, clostridium*, and other organisms posing significant health risks.

BRIEF DESCRIPTION

A primary objective of the invention is to reduce operating costs of heat transfer systems which use water as a working fluid, by maintaining component operating efficiency, extending component service life, reducing the volume of water lost to discharge. Unfortunately, municipal water treatment methods, although managing to limit bacteria, cannot reasonably be expected to supply industrial volumes of water as a working fluid entirely free of dissolved solids and microbes. Evaporation cycles concentrate these solids to cause scale and corrosion, increasing viscous friction in piping, lowering thermo-dynamic efficiencies, and reducing equipment service life. Removing or reducing dissolved solids from process water preserves operational efficiency and limits operating cost.

Another objective of the invention is to create a biological environment less accommodating to microbial growth, by removing dissolved solids which attract or sustain microbes. A corollary objective of the invention is to reduce chemical and bacterial hazards in the immediate vicinity of cooling towers.

Yet another objective of the invention is to reduce waste water and water consumption in general by providing equipment which separates process water into a first, reusable portion having reduced contaminants, and a second portion called 'bleed water' or 'blow-down water' in which unwanted materials are more highly concentrated. This second portion is discharged, often into municipal drainage systems which incurs a sewerage fee from the municipality. Fees are usually assessed by the volume of water accepted for treatment rather then the amount of contaminants entering the treatment system.

The volume of bleed water lost must be replaced with 'make-up' water bought from the municipality. Improved water recovery may thus reduce the volume of bleed water, sewerage fees, and reduce the volume and cost of make-up water required.

In recirculating cooling water systems, evaporation continuously concentrates impurities initially present in water supplied by the municipal water supply. Water collected after passing through an evaporative cooling system must be purified or "polished" to remove impurities (predominantly calcium, magnesium, silica oxides and sodium) continuously entering the system. Regular removal of these and other minerals has a secondary effect of maintaining the pH balance of the water at or near neutral (a pH of 7.0.) Removing ions that tend to make the water more acidic reduces the rate of corrosion wherever water remains in contact with metal. Unfortunately, most chemical treatments, especially for control of microbes, leave the water in a condition where polishing method requirements are usually complicated and expensive. Thus yet another objective of the invention is to provide a filtration apparatus which uses effective but non-chemical treatment means, so that fewer corrosion-inducing chemicals are introduced into the circulating water in the first place.

Another objective of the invention is to prevent accumulation of debris in the basin. Returning the treated water to the basin through venturi type water jets continually agitates the water to keep soils and biomass suspended and ultimately collected by the centrifugal filter.

Yet another objective of the invention is to provide an ancillary system for monitoring and control of the pH of the circulating water.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Detailed Description of Certain Embodiments

Figure 1:
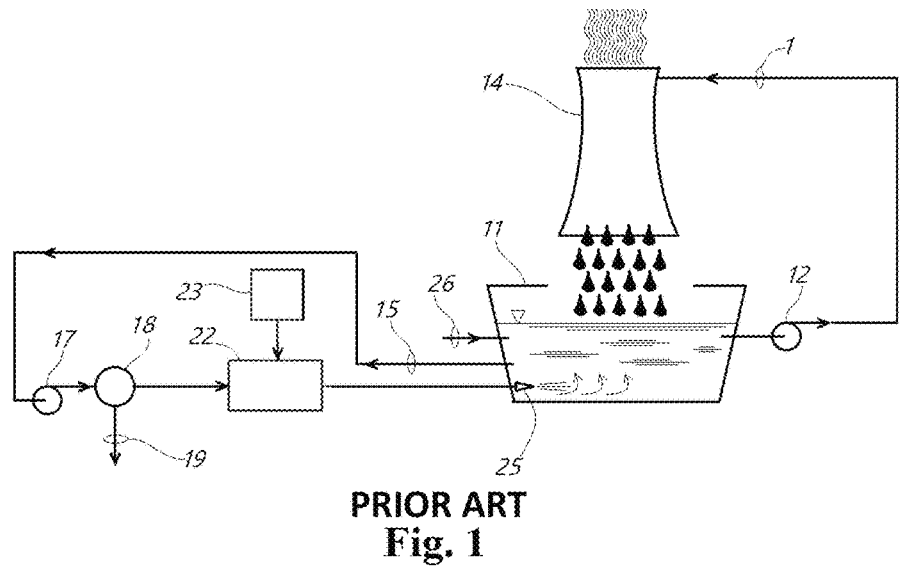
FIG. 1 shows a schematic diagram for a conventional cooling tower recirculation system.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention relates to a water conditioning system and is primarily directed to evaporative cooling systems. The new arrangement of system components reduces operating costs and microbial contamination by introducing positively charged copper and silver ions into water used as a working fluid. A portion of the recirculating water is also passed through a magnetic conditioner to decrease its electrical conductivity. By concentrating the total dissolved solids (TDS) in a portion of the water to be expelled, the remaining system water plus new make-up water added contains far lower TDS, which reduces health risks, maintenance costs, and operating inefficiencies caused by corrosion and scaling, and extends service life of the tower and replaceable filter elements and system machinery.

Another useful term to define in this specification is "cycles of concentration," also called "cycles" in this industry. Although it is tempting to try to relate the term "cycles" to the number of times a unit of water has circulated from a basin through a cooling tower and back, the numerical value of "cycles of concentration" is calculated as the TDS of the basin water divided by the TDS of incoming make-up water. Typically, at 3 or 4 cycles of concentration, the TDS gets high enough that scaling will become likely and problematic. Many systems operate at 2 to 3 cycles of concentration, while 6 cycles or more may be possible when make-up water is especially free from dissolved solids. As an exemplary estimate, increasing a system's cycles from 3 to 6 may reduce cooling tower make-up water consumption by 20% and reduce cooling tower blowdown losses by 50% or more.

Evaporative cooling towers are used to reject heat generated by many sorts of industrial processes which generate unwanted heat. Besides heat transfer to the cooling water raising its temperature as it passes over heat dissipating surfaces within the cooling tower, the phase change from liquid water to vapor as it evaporates removes much more heat energy than the heat gain in the water. For example, one pound of water introduced into an intercooler at 75° F. which leaves the system at 125° F. removes 50 BTUs of energy, but evaporation of that one pound of water removes 970 BTUs.

The majority of heat removed is due to evaporation and the remaining cooled water drops into a collection basin. Level control applications include a high level switch to avoid overflow conditions in the cooling tower basin. Water infeed and basin levels of the cooling tower require level sensing and control. Once-through and open or closed recirculating water systems may support microbial growth, but fouling problems usually develop more quickly and are more extensive in open recirculating systems.

FIG. 1 shows a schematic diagram for a conventional cooling tower recirculation system. A cooling tower [14] rejects waste heat to the atmosphere through transfer of the heat to cooling water [1] delivered to it. Streams of cooling water within the tower structure are usually open to atmosphere, so that some if not most of the heat gets carried off by evaporation of the cooling water. The remaining water collects in a collection basin where it may also cool to a temperature closer to ambient atmospheric conditions. A recirculating pump delivers cooled water back to the tower.

Operational problems and undesirable conditions become immediately apparent. First, water lost to evaporation must be replaced, so make-up water is added occasionally. Meanwhile, the minerals in the water and the added water do not evaporate, so the concentration of minerals (TDS) rises over time. Calcium is one of the most common dissolved minerals found in municipal water, and as calcium concentration rises, eventually this calcium precipitates to form an insulating scale inside piping, which decreases heat transfer efficiency of the equipment. Rejecting the same amount of heat requires longer and longer operating hours of pumps and fans, and scaling also abets corrosion of pipes other surfaces in the tower and other equipment. The only way to lower the concentration of calcium content in the cooling tower water basin is to bleed away high TDS water out of the basin and replace it with low TDS make-up water from the city utility.

This process is normally effected through a side stream filtration system also shown in the figure. A side stream system circulates independently from the cooling water cycle. Side stream filtration is accomplished by agitating water and filtering stirred-up particles. Water is removed from the basin through a second suction line [15] and drawn by a pump [17.] When the TDS level exceeds an acceptable value, a purge valve discharges high TDS water from the basin to the municipal waste water system [19,] which incurs a fee. If the water is not dosed with treatment chemicals then this bleed water or "blow down water" may be passed through the municipal storm water infrastructure and incur little or no cost. Otherwise, if basin water is dosed with treatment chemicals, the blow down water must be directed to a municipal water treatment plant, which incurs higher fees.

Municipal sewer water fees are usually set per unit of water discharged, but not necessarily by amount of unwanted compounds relieved from the system, unless water toxicity from treatment chemicals such as biocides requires the plant operator to discharge to a municipal water treatment plant. If the discharge water is free of these toxins, disposal costs are lower because the water may be released to the municipal storm water system instead. However, if a plant operator makes an error and discharges water high in biocides into a municipal storm drain system, higher fines or legal penalties may also accrue. By replacing chlorine treatment with treatment by copper-silver ionization, the discharged water from the invention is non-toxic and may be passed through regular storm water rather than fee-based special reclamation systems, or the water may be used for landscape irrigation.

Monitoring and measuring of TDS is often performed manually by scheduled water testing, which may disadvanta-geously allow sudden or unpredicted rises in TDS to go undetected between scheduled test intervals. Technicians lacking real-time monitoring of water conditions may try to make estimates for the amount of blow-down volume to be discharged, and errors either way would either cause insufficient reduction of TDS remaining in circulation, or excess water discharge, with its associated fees, and excess consumption of make-up water.

Besides struggling with problems associated with high concentrations of dissolved solids, cooling water passed through the tower or intercooler and recovered in a collection basin has often been exposed to uncontrolled atmospheric air, whereby it picks up airborne impurities such as dust, pollen, microbes, insects, and other airborne particles. Warm temperatures and darkness inside towers and piping creates a haven for undesirable microbial growths, including *legionella*, coliforms, *salmonella, clostridium*, and other organisms posing significant health risks. Biocides containing chlorine or bromine are usually added to cooling water to control microbes, but these are also usually toxic to marine and freshwater life.

When not discharging blow-down water, the purge valve is closed and the water then treated with additives [23] to abate scaling and microbial growth. Blow-down water containing high levels of these chemicals must be treated at the municipal waste water system, which again incurs higher disposal costs. The filtered and treated water is then re-introduced into the basin through sweeper jets [25] which direct forceful flowing water to prevent sediment accumulation. The jets stir up solid particulates and foreign matter entrained into the cooling water in open-air systems, where it is endeavored that they eventually get drawn into the side stream suction line so that they may be trapped by filter elements and removed from circulation. Nevertheless, flow velocities may be low or zero in some parts of the basin, leaving havens for scale accumulation and sessile bacterial growth.

"Drift" is another undesirable effect in proximity to cooling towers, especially when forced air is directed at cooling surfaces as they are sprinkled with cooling water. The air flows within the cooling tower may carry off liquid water to the environment via small droplets that become entrained in the exhaust air stream. This water is not only lost to the system and must be replaced by make-up water, but the droplets carry with them the treatment chemicals and active microbes which contaminate the surrounding environment.

Other cooling apparatus arrangements include "once-through" and closed recirculating water systems. Once-through systems assume an incoming water source which is essentially vast or otherwise limitless, such as when drawing from a flowing river or some other large body of water where changes of cooling water TDS after its partial evaporation while passing through the cooling tower do not substantially affect the quality of the incoming water, because the system may be modeled as an open loop. Closed recirculating systems do not include evaporation or other interactions with the atmosphere. Both types of systems may support microbial growth, but fouling problems usually develop more quickly and are more extensive in open recirculating systems.

Lastly, besides the system depicted in this figure, some if not most cooling systems do not include side stream filtration and instead simply recirculate water with continuously increasing TDS levels until they are periodically flushed or partially bled down and replenished by command of a process controller either set to a schedule or having a conductivity sensor which triggers a blow down whenever a pre-programmed TDS limit value is met or exceeded. Bacterial and scaling problems, and corrosion typically run rife with these primitive systems.

Figure 2:
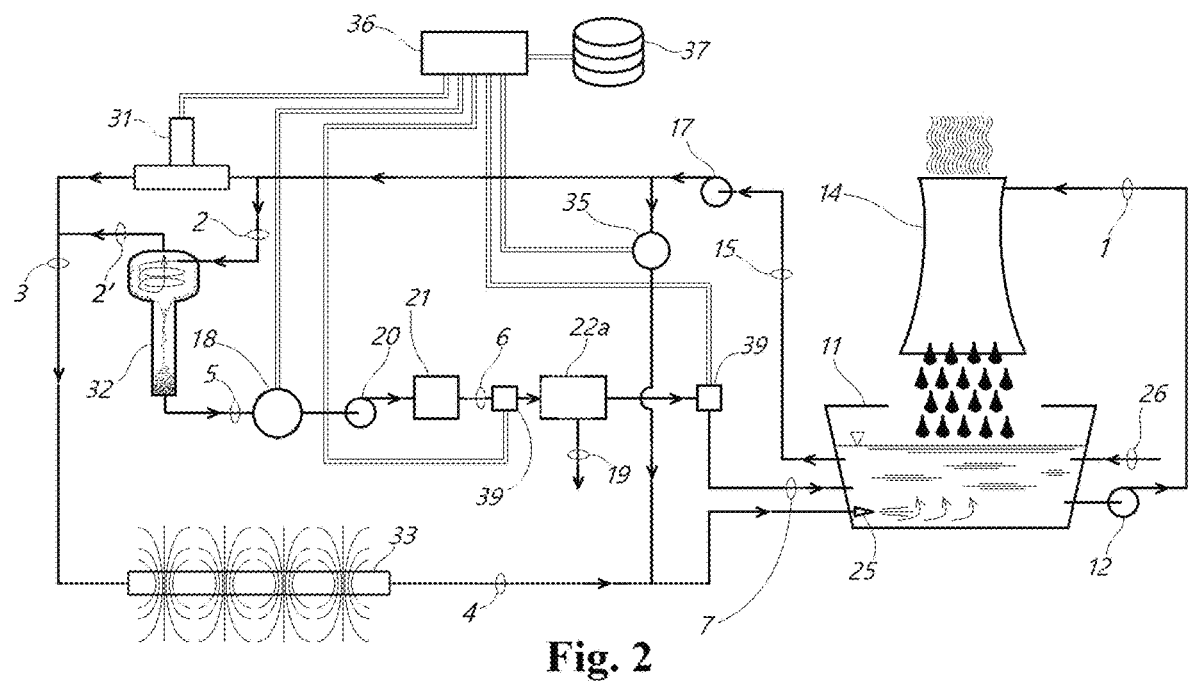
FIG. 2 shows a schematic diagram for a cooling tower recirculation system with a water conditioning system in accordance with the invention.

FIG. 2 shows a schematic diagram for a cooling tower recirculation system with a water conditioning system in accordance with the invention. Solid black lines represent pumping and white lines represent electrical signal wiring. The cooling water [1] circuit running from a coiling tower [14,] a collection basin [11,] and circulation pump [12] is the same as in the previous figure. Make-up water [26] is also available as needed.

However in the embodiment of an improved side stream filtration circuit shown, basin water is first drawn off through a suction line [15] by a suction pump [17.] The pump has a suction inlet and a pressure outlet and defines flow directions within the system and defines upstream and downstream ordering of components along a flow direction.

A first portion of the pumped water passes through a conductivity sensor [35] and is returned to the basin via sweeper jets [25.] The rest of the water then continues so that a second portion passes into an ionizer [31] which uses sacrificial copper-silver anode bars to impart copper and silver ions into the water. The copper-silver bars may be formed by mixing flakes of copper and silver together and compressing them into a substantially solid mass, or they may be formed by melting and mixing the constituents and then casting alloy bars. A process controller applies a positive voltage to the anode bars.

Positive ions of silver and copper in aqueous solutions abate fungus, bacteria, and viruses by forming bonds with negatively charged ions on the bacterial cell walls. Lysis and bacterial cell death is the result. Copper and silver ion concentrations in the ranges of 0.3-0.8 mg/L copper and 0.01-0.08 mg/L silver are recommended for *legionella* control. Also, the biocidal effects of copper-silver ionization of water persist at higher temperatures where chlorination becomes less effective. Copper and silver ions have also been demonstrated to be bactericidal in vitro and in model plumbing systems against other waterborne pathogens including *Pseudomonas aeruginosa, Stenotrophomonas maltophilia*, and *Acinetobacter baumannii*.

Upstream from the ionizer the tubing bifurcates into two water conditioning branches, a first branch [2] which leads through a centrifugal filter [32] bypassing the ionizer by exiting the filtered water outlet at [2'] and rejoining the flow at [3,] and then passing through a magnetic conditioner [33.] The water preferably passes through at least four sets of high intensity alternating magnetic fields oriented perpendicular to the flow direction, and field strengths of at least 1100 Gauss. In this specification the term "alternating magnetic fields" means that for a series magnetic fields along a flow direction, the magnetic flux direction of a first field encountered by the water is oriented opposite to the next or a second magnetic field in the series, and the magnetic flux direction of the next or a third field encountered by the water after the second field is also oriented opposite to the previous or second magnetic field, and so on through the series of alternatingly oriented magnetic fields in the magnetic conditioner. This magnetically treated water at [4] reduces scale formation even at high levels of conductivity, and is also returned to the basin through the sweeper jets.

A third portion of the water from the first pump passes into a centrifugal filter which includes an inlet and creates an inverted vortex in which cleaned water spirals inward and exits a central orifice in the top of a centrifugal chamber, which is the filtered water outlet. The cleaned water is then re-introduced into the flow downstream of the ionizer. Solid particles and suspended material flee to the periphery of the chamber and precipitate downward into a collection portion or trap. While collecting sediment, about 2% of the flow through the ionizer passes through the centrifugal filter and the rest passes through the ionizer.

The centrifugal filter is periodically purged by opening a purge valve [18,] and an on-demand pump [20] includes a pressure detector which senses when the purge valve is open. This pump sucks out the precipitates and mud fines, pollen, and other solids previously entrained in the cooling tower through the sediment water outlet of the centrifugal filter, where they are captured in a pre-filter [21] upstream of a nanofilter [22a.] No anti-scalants are required or used in the recirculating water.

During the purge of the centrifugal pump, the nanofiltration system removes dissolved solids and disposes of high TDS water to the municipal waste water system [19.] The rest of the water recovered by the nanofiltration system is returned to the basin as purified water with its dissolved solids nearly if not entirely removed. Nanofiltration systems may typically recover at least 70% of the water passed through them while diverting dissolved solids to the 30% which is discharged. A first advantage of the inventive system is immediately appreciated in the at least 70% of the purge water which is returned to circulation in the basin rather than disposed of for the municipal fee.

Disinfecting the water by copper-silver ionization allows simpler and more efficient nanofiltration systems to be used in this system, because water sanitized with chlorine, bromine, or other chemical biocides creates water which cannot be directly purified by nanofiltration systems unless other expensive equipment is installed upstream of the nanofiltration system to abate or remove the treatment chemicals.

Besides nanofiltration and recovery of water, hydrodynamic cavitation (HC) is emerging as a promising technology for large-scale disinfection replacing conventional chemical biocidal treatments. HC induces sonochemistry by mechanical means, creating extraordinary pressure conditions of around 1000 bar with local hotspots of around 5000 K, and high oxidation (hydroxyl radicals) in the fluid environment and also create dissolved ozone in water. These conditions advantageously produce highly destructive effects on microorganisms in water. Hydrodynamic cavitation surpasses the 70% recovery figure of nanofiltration systems, recovering 90-95% of water passed through while concentrating the same amount of solids into only 5%-10% of incoming water.

The combination of side stream filtration of non-chemically treated water which allows recovery of bleed water through reverse osmosis or hydrodynamic cavitation, or both systems in concert, all serve to distinguish the inventive system from other current practices.

A process controller [36] monitors operational activities and records them in a data storage system which includes a non-transient computer-readable medium [37.] A first function of the process controller is to periodically provide galvanic voltage to the copper-silver bars to foment electrolytically assisted ionization of the metal atoms so that they diffuse into the water more effectively than by passive consumption. A second function of the process controller is to monitor conductivity and to actuate the purge valve to discharge high TDS water when a measured conductivity level is met or exceeded. Although the system may be set to trip the purge valve at about 2000 microsiemens per centimeter ($\mu$S/cm,) a preferred trip point for conductivity may be 1000 $\mu$S/cm which roughly corresponds to about 500 parts per million (ppm) TDS. This lower level represents a competitive breakthrough within the industry. Conductivity is a measure of water's capability to pass electrical flow, which is also directly related to the concentration of ions in the water. These conductive ions come from dissolved salts and inorganic materials such as alkalis, chlorides, sulfides and carbonate compounds. TDS is roughly proportional to conductivity; e.g. 1000 ppm is roughly 2000 $\mu$S/cm.

The controller preferably includes an LED or LCD display to display measured conductivity in real time. During a blow down, two flow meters [39] provide direct monitoring of the recovery ratio of the filtered water returned to basin at [7,] versus the water discharged to the municipal waste water system. Preferably, one flow meter is placed upstream of the nanofilter and the other is placed downstream to determine the recovery by water in compared to water out, and some nanofiltration systems have an integrated flow meter. Alternatively, one could place a first flow meter at the discharge line and a second flow meter measuring water return to basin as shown. Also, although the figure shows white lines as physical connections or "hard" wiring to the controller, it may be preferred to use radio remote telemetry means such as Bluetooth® or WiFi to transmit measurement data and to transmit and receive commands from the controller.

Note that FIGS. 1 and 2 are schematic diagrams, and so the relative positions of components, and the positions or directions of piping or wiring only indicates which components are connected to which and in which order they may be assembled along a flow direction. Components located above other components in the schematic do not have to be physically located higher than the others in actual assembly; for example, piping connections to the basin at [7,] [15,] and [26] are not necessarily higher than [12] and relative to the water level in the basin.

Operating performance records may be accessed remotely and presented to water quality authorities to demonstrate continuing compliance with prevailing regulations, and as an audit record to verify that the waste water fees being paid are correct. Measured losses of water recovery efficiencies may be used to trigger or schedule maintenance tasks and service calls. Furthermore, simultaneous monitoring of a large installed base of the inventive water conditioning systems enables "big data" analysis and the identification of mega-trends larger and more informative than the operational histories of individual systems. For example, labor efficiency may be improved by converting redundant scheduled maintenance tasks into specific, as-needed maintenance tasks with technicians dispatched on a tactical basis whenever monitored systems report conditions indicating they are ready for filters to be changed, or copper-silver anode bars or other consumable supplies are ready to be replenished. Additionally, seasonal changes in operating variables may be observed over time so that the need for particular maintenance tasks or replenishments may be more accurately forecast.

For example, in areas of the US southwestern states, evaporative cooling for air conditioning and the demand on municipal water supplies peaks in summer months. Surface water sources are typically unable to meet the total demand, and so municipalities must then resort to pulling high TDS water from deep aquifers. These water systems are known globally to have some of the hardest water (highest TDS) in municipal service. The inventive system combining side stream filtration with copper silver ionization and magnetic conditioning of the water may extend life of a cooling tower 7 years to over 20 yrs. This extension of service life also defers replacement costs, which include decommissioning and the costs of rubbling and disposing of the old equipment.

In another example, a school HVAC system has a capacity of 800 refrigerator tons. A conventional cooling tower set up for this system will discharge 2.5 million to 4.5 million gallons of high-TDS water annually, which must go through the municipal waste water treatment station rather than the storm drain system. Using the inventive system instead, a 70% reduction of discharge volume is achieved, meaning 1.75 million gallons of water is saved from wasting to the discharge and is instead recirculated to the tower. This recovered water does not have to be re-purchased as make up water, nor does it incur a charge as sewer fees. Meanwhile the remaining 750,000 gallons may be passed out through the storm drains with no additional municipal charges. As an extension of this example, 500 installations in the city of Phoenix, AZ alone would save over 1 billion gallons of water per year. Thus it may be appreciated that a first set of benefits of the invention include improved heat transfer efficiency, bacterial control without toxic chemicals, reduced system run time hours, prolonged service life of the tower, lower labor costs, and less system downtime because scheduled maintenance tasks are less intense, less frequent, and require less personal protective equipment for the technicians, because the environment around the tower is less toxic. Table 1 below shows some exemplary values of water consumption rates relating cycles of concentration versus various sizes of cooling towers sized by HVAC system capacity in refrigerator tons:

TABLE 1

| | | Bleed Rate in Gallons/minute | | | | | | |
|---|---|---|---|---|---|---|---|---|
| | | Cycles of Concentration → | | | | | | |
| | | 2 | 3 | 4 | 5 | 6 | 7 | 8 |
| Tower Tonnage | 50 | 1.5 | 0.75 | 0.5 | 0.37 | 0.3 | 0.25 | 0.21 |
| | 100 | 3.0 | 1.5 | 1.0 | 0.75 | 0.6 | 0.5 | 0.425 |
| | 200 | 6.0 | 3.0 | 2.0 | 1.5 | 1.2 | 1.0 | 0.85 |
| | 250 | 7.5 | 3.75 | 2.5 | 1.87 | 1.5 | 1.25 | 1.06 |
| | 300 | 9.0 | 4.5 | 3.0 | 2.25 | 1.8 | 1.5 | 1.27 |
| | 400 | 12.0 | 6.0 | 4.0 | 3.0 | 2.4 | 2.0 | 1.7 |
| | 500 | 15.0 | 7.5 | 5.0 | 3.75 | 3.0 | 2.5 | 2.12 |
| | 600 | 18.0 | 9.0 | 6.0 | 4.5 | 3.6 | 3.0 | 2.55 |
| | 700 | 21.0 | 10.5 | 7.0 | 5.25 | 4.2 | 3.5 | 2.97 |
| | 780 | 22.5 | 11.25 | 7.5 | 5.62 | 4.5 | 3.75 | 3.19 |
| | 800 | 24.0 | 12.0 | 8.0 | 6.0 | 4.8 | 4.0 | 3.4 |
| | 1000 | 30.0 | 15.0 | 10.0 | 7.5 | 6.0 | 5.0 | 4.25 |

TABLE 1-continued

| | Bleed Rate in Gallons/minute | | | | | | |
|---|---|---|---|---|---|---|---|
| | Cycles of Concentration → | | | | | | |
| | 2 | 3 | 4 | 5 | 6 | 7 | 8 |
| 1250 | 37.5 | 18.75 | 12.5 | 9.37 | 7.5 | 6.25 | 5.31 |
| 1500 | 45.0 | 22.5 | 15.0 | 11.25 | 9.0 | 7.5 | 6.37 |
| 2000 | 60.0 | 30.0 | 20.0 | 15.0 | 12.0 | 10.0 | 8.5 |

A second benefit of the invention is substantial water conservation. The invention combines non-chemical water treatment, that is, treating the tower water in the cooling tower basin with copper/silver ionization to disinfect the water, plus magnetic conditioning to reduce a propensity for scaling, with automated measurement and purging of high TDS water through the use of a controller that senses the TDS and activates a motorized purge valve. Water exiting that valve may be polished through nanofiltration membranes, and the recovered low TDS water returned back to the tower, thereby reducing the requirement for make-up water. These improvements combine to reduce the amount of bleed water, reduce or eliminate the requirement for bleed water to be poured down a sanitary drain, and reduce or eliminate sewer fees because the bleed water has not been toxically dosed in the first place.

Figure 3:
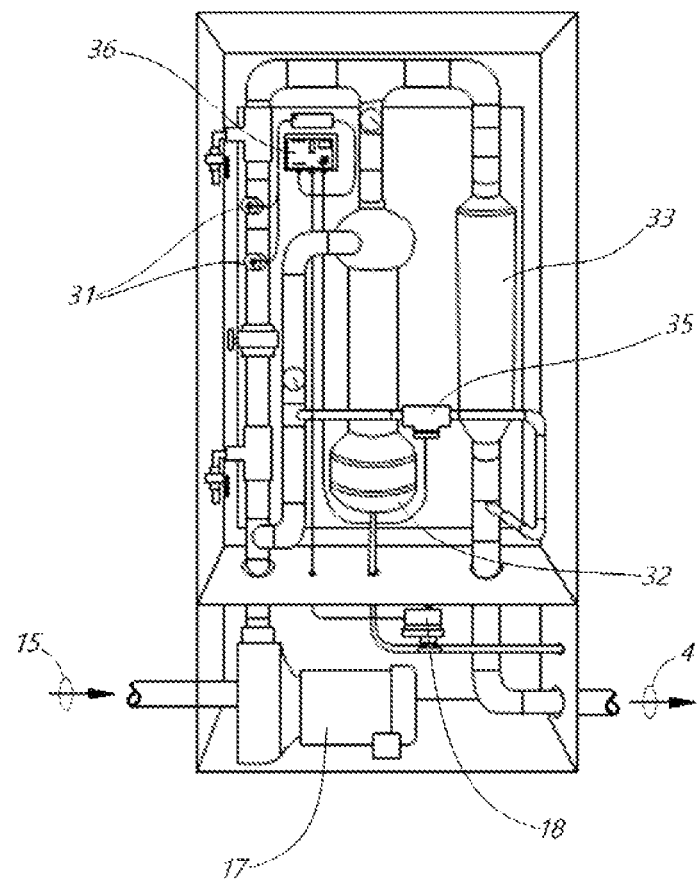
FIG. 3 shows some of the water treatment components of FIG. 2 arranged in an enclosure.

FIG. 3 shows some of the water treatment components of FIG. 2 arranged in an enclosure. Cooling water drawn in through a suction line [15] is pumped to an operating pressure by pump [17.] In this embodiment, the ionizer column [31] is seen at left within the enclosure, and the fluid flow branches containing the centrifugal filter [32,] and purge valve [18,] and conductivity sensor [35] reside in the center of the enclosure, with the magnetic conditioner [33] and return line [4] leading to the sweeper jets residing at right. The enclosure also houses the controller [36] which may employ direct wiring to the components it interacts with or may also use remote telemetry, remote control, or Bluetooth or other wireless networking and communication.

Figure 4:
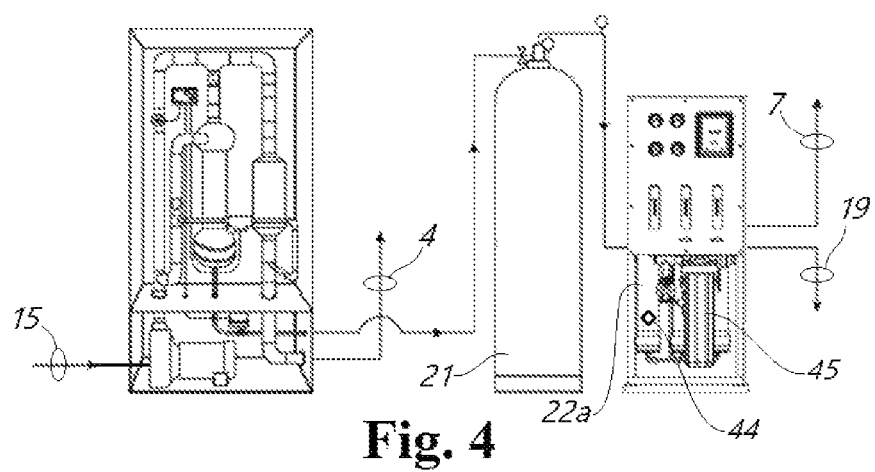
FIG. 4 shows some of the reverse osmosis system components connected downstream of the water treatment components shown in FIG. 3.

FIG. 4 shows some of the nanofiltration system components connected downstream of the water treatment components shown in FIG. 3. Water drawn in by suction line [15] for ionization and magnetic treatment returns to the basin by outlet [4] which leads to the basin sweeper jets. When the purge valve is opened, the nanofiltration system recovers a significant fraction of water which in previous systems is entirely lost to the municipal waste water system. After prefiltering [21] for sediment removal, the nanofiltration system separates high TDS water to be discharged to waste water at [19] from polished water to be returned to the basin at [7.] Some nanofiltration systems are cartridge-based and use sets of replaceable and disposable cartridges for osmosis membranes [22a] and other polishing functions such as secondary or additional redundant sediment filtration. Nanofiltration systems generally filter out dissolved solids smaller than 1 micron, such as fluoride and arsenic. Activated carbon filter cartridges [45] reduce organic chemicals like herbicides, pesticides, volatile organic compounds (VOCs) and methyl tert-butyl ether (MTBE.) Catalytic carbon filters target chlorine and chloramines found in chlorine and ammonia-based disinfectant products. Magnetically treated water will precipitate scale in the pores of the filters, and then the precipitated scale is removed with hydrodynamic cavitation with ultrasonic transducers attached to the nanofilter housings and is flushed to storm sewer. A preferable attachment schema is to attach a pair of ultrasonic transducers to each housing, one near each end of the housing, and oriented mutually opposing each other, such as an upper left and lower right sites of a housing, or on an upper front site and a lower rear site on a housing.

Figure 5:
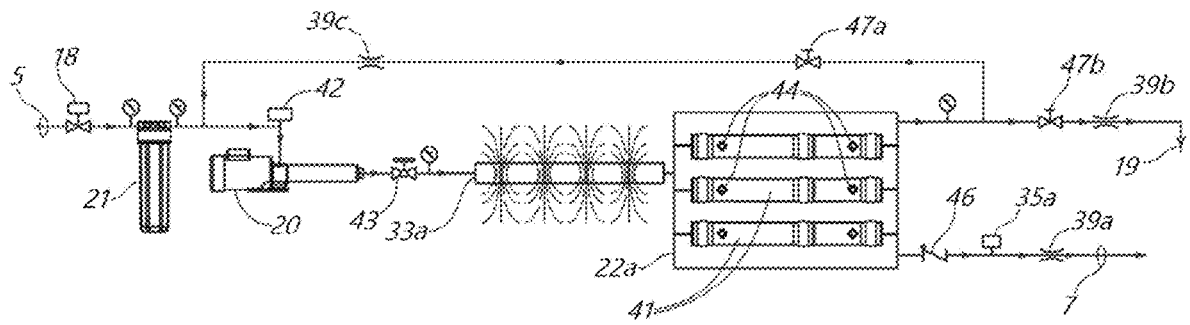
FIG. 5 shows an alternate arrangement of reverse osmosis system components in accordance with the invention.

POW FIG. 5 shows an alternate arrangement of reverse osmosis system components in accordance with the invention which includes a concentrate recycling loop. Sediment-containing water separated in the centrifugal filter of FIG. 2 is removed when purge valve is opened. The purge valve may also serve as a shut-off valve in coordin-ation with other shutoff valves [43] and [47a] and [47b] during maintenance of the system or while replacing filter cartridges. A preferred sediment pre-filter [21] may be a 5 micron sediment filter. A low pressure switch (LPS) [42] detects when the purge valve is opened and energizes the nanofiltration system pump [20] to pass water through a magnetic conditioner [33a.] The nanofiltration system [22a] includes replaceable and disposable cartridges [41] which contain the osmosis membranes. Magnetically treated water will precipitate scale in the pores of the filters, and then the precipitated scale is removed with hydrodynamic cavitation with ultrasonic transducers [44] and is flushed to storm sewer.

A first flow meter [39a] monitors water returned line to the basin by line [7.] A second flow meter [39b] monitors discharge of concentrated, high-TDS water to the drain [19.] A third flow meter [39c] monitors flow through the concentrate recycling loop. A second conductivity sensor [35a] measures TDS conductivity for a local display at the control panel for this unit. A check valve [46] prevents backflow of basin water into the nanofiltration system membranes.

Figure 6:
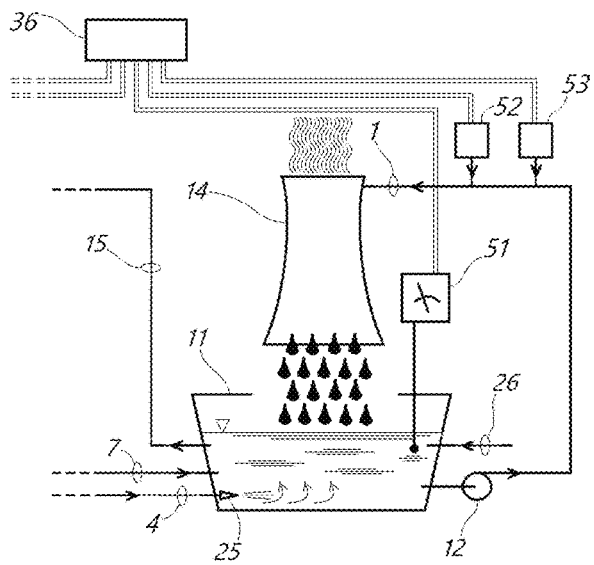
FIG. 6 shows another alternate embodiment of an arrangement of water treatment and conditioning components in accordance with the invention.

FIG. 6 shows another alternate embodiment of an arrangement of water treatment and conditioning components in accordance with the invention. Maintaining correct pH levels in water used in cooling towers greatly aids in preventing scale and corrosion. Preferred operating ranges of pH often depend on the metals used for the cooling tower and the system plumbing. A pH between 7 and 8.5 is a preferred range for reducing scale formation. The operating pH may also depend on the cycles of concentration of the system. Because most scale comprises calcium carbonate, some systems lacking the invention exhibit poor scale control and may reach a higher pH, even up to 10. High alkalinity in turn reduces the effects of biocides used to control microbes, so that operators may often add much more disinfectant chemicals to the water than they would otherwise use in a system operating within the preferred range. Loss of anti-microbial effectiveness of chlorine at higher pH is a known problem in the industry.

To control and maintain pH within a preferred range, a pH sensor [51] reads the basin water pH and transmits its reading to the controller [36.] As with all other control circuitry in the invention, this signal may be analogue or digital, and may comprise either serial or parallel data for signaling. Also as elsewhere, besides hard-wired connections, remote telemetry, wireless networking, and radio control may be used for signal transmission between the components described in this figure. Also, the broken lines extending to the left of the figure indicate other connections to other components such as those seen in FIG. 2 or FIG. 5.

As seen elsewhere, water is drawn out of the basin [11] by suction line [15] and a portion is returned after magnetic conditioning through a return line [4] which feeds sweeper jets [25,] while a different portion is recovered through the nanofiltration system and returned through line [7.] Cooling tower water [1] is pumped by a cooling pump [12] to pass through a cooling tower [14] and collected in a basin beneath the tower. Water lost by evaporation is replaced by make-up water [26.]

An automatic feedback control loop monitors system pH and adds conditioning chemicals from either a pH-lowering chemical dispenser [52] or a pH-raising chemical dispenser [53.] Although these dispensing units are shown on the pressure side of the coolant pump as preferred, they may be incorporated into any of the other plumbing lines in the system. pH lowering chemicals include sodium sulfate, acetic acid, citric acid, and alum. "Alum" in this specification usually refers to a hydrated double sulfate salt of aluminum which includes a monovalent cation such as potassium or ammonium. "Alum" may also refer to potassium alum, aluminum sulfate, or aluminum hydroxide, but may also refer to sodium alum and ammonium alum and is also used more generally for salts with the same formula and structures, except that aluminum is replaced by another trivalent metal ion like chromium, or wherein the sulfur is replaced by another chalcogen like selenium.

Weak solutions of hydrochloric acid or sulfuric acid may also be effective but are less preferred. pH raising chemicals include sodium hydroxide, sodium bicarbonate, and sodium carbonate. Borax or other compounds containing boron, and bromine compounds may also be used but they are less preferred, and aeration may also raise pH by driving dissolved carbon dioxide out of the water.

Figure 7:
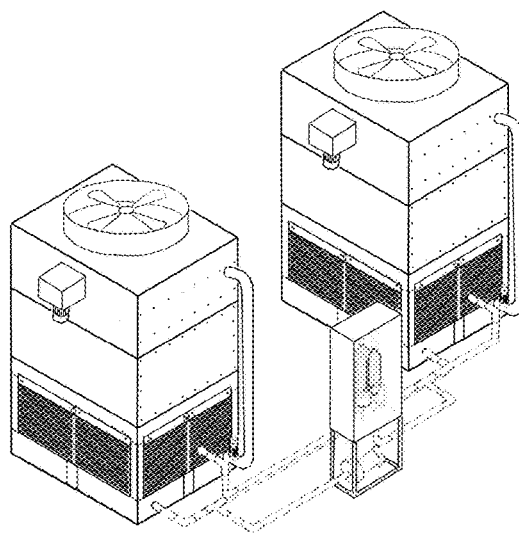
FIG. 7 shows a system in accordance with the invention connected so as to serve several cooling tower basins.

FIG. 7 shows a system in accordance with the invention connected so as to serve two cooling tower basins in tandem. Multiple suction lines may be combined to feed a single system and the single system outputs may be distributed to more than one basin being treated. Although two cooling tower units are shown, the invention may be sized to handle many more than two units simultaneously.

NOM While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed. Consequently and in summary, although many exemplary embodiments are described above, it will be appreciated that the invention is intended to cover all modifications and equivalents within the scope of the following claims.

What is claimed is:

1. A water conditioning system comprising:
    a first pump having an inlet and an outlet, and defining a flow direction,
    an ionizer comprising a copper-silver anode,
    a magnetic conditioner,
    a water conductivity sensor,
    a centrifugal filter having an inlet, a filtered water outlet, and a sediment water outlet,
    a purge valve attached at said sediment water outlet, and
    a nanofiltration system downstream of said purge valve, and comprising a fluid flow circulation system configured
    wherein a first portion of fluid leaving said outlet of said first pump passes through said ionizer,
    a second portion of fluid leaving said outlet of said first pump passes through said inlet of said centrifugal filter, exits said filtered water outlet of said centrifugal filter, and rejoins with said first portion, and
    wherein said first and second portions of fluid thereafter pass through said magnetic conditioner.

2. The water conditioning system of claim 1, wherein said ionizer imparts aqueous copper ions to a concentration range between about 0.3 mg/L and about 0.8 mg/L inclusively.

3. The water conditioning system of claim 1, wherein said ionizer imparts aqueous silver ions to a concentration range between about 0.01 mg/L and about 0.08 mg/L inclusively.

4. The water conditioning system of claim 1, wherein a ratio of fluid flow through said ionizer is about 2% of fluid flow through said centrifugal filter.

5. The water conditioning system of claim 1, further comprising a nanofiltration pump connected between said purge valve and said nanofiltration system.

6. The water conditioning system of claim 1, wherein said magnetic conditioner is configured such that water passing through said magnetic conditioner passes through at least four sets of alternating magnetic fields oriented perpendicular to its flow direction.

7. The water conditioning system of claim 6, wherein said magnetic conditioner has a field strength of at least 1100 Gauss.

8. The water conditioning system of claim 1, further comprising a process controller for applying an electric current at said copper-silver anode of said ionizer.

9. The water conditioning system of claim 8, wherein said process controller is configured to apply a positive voltage to said copper silver anode.

10. The water conditioning system of claim 8, wherein said process controller monitors conductivity sensed by said conductivity sensor and opens said purge valve when sensed conductivity exceeds a predetermined value.

11. The water conditioning system of claim 8, wherein said process controller is connected to a non-transient computer-readable medium.

12. The water conditioning system of claim 1, further comprising a second pump between said purge valve and said nanofiltration system.

13. The water conditioning system of claim 1, further comprising a flow meter connected upstream of said nanofiltration system.

14. The water conditioning system of claim 1, further comprising a flow meter connected downstream of said nanofiltration system.

15. The water conditioning system of claim 1, wherein water passed through said magnetic conditioner also passes through sweeper jets disposed in a basin.

16. The water conditioning system of claim 1, further comprising a pH sensor, a process controller for monitoring system pH, and a dispenser controlled by said process controller, said dispenser containing a chemical selected from the set of chemicals consisting of:
    sodium sulfate, acetic acid, citric acid, alum, a hydrated double sulfate salt of aluminum, a sulfate salt which includes potassium as a monovalent cation, a sulfate salt which includes ammonium as a monovalent cation, potassium alum, aluminum sulfate, aluminum hydroxide, sodium alum, ammonium alum, a trivalent metal ion, chromium, a chalcogen, hydrochloric acid, selenium, sulfuric acid, sodium hydroxide, sodium bicarbonate, sodium carbonate, borax, boron, chlorine, sodium hypochlorite, calcium hypochlorite, and bromine.

17. The water conditioning system of claim 1, comprising a filter housing of said nanofiltration system which further comprises an upper end and a lower end opposite said upper end, and a left side and a right side opposite said left side, and further comprising a first ultrasonic transducer affixed to an upper left site of said filter housing and a second ultrasonic transducer affixed at a lower right site of said filter housing.

18. A water conditioning system comprising:
    a first pump having an inlet and an outlet, and defining a flow direction,
    an ionizer comprising a copper-silver anode,
    a water conductivity sensor,
    a centrifugal filter having an inlet, a filtered water outlet, and a sediment water outlet,
    a purge valve attached at said sediment water outlet, and
    a nanofiltration system downstream of said purge valve, and comprising a fluid flow circulation system configured
    wherein a first portion of fluid leaving said outlet of said first pump passes through said ionizer,
    a second portion of fluid leaving said outlet of said first pump passes through said inlet of said centrifugal filter, exits said filtered water outlet of said centrifugal filter, and rejoins with said first portion, and further comprising
    a sediment pre-filter connected after said purge valve,
    a second pump after said sediment pre-filter,
    a magnetic conditioner attached after said second pump, and with an outlet of said magnetic conditioner connected to said nanofiltration system.

19. The water conditioning system of claim 18, wherein said magnetic conditioner establishes magnetic fields so that water passing through said magnetic conditioner passes through at least four sets of alternating magnetic fields oriented perpendicular to its flow direction.

20. The water conditioning system of claim 18, further comprising a low pressure switch connected between said purge valve and said second pump, and a first flow meter connected downstream of said magnetic conditioner.

\* \* \* \* \*